US009392576B2

(12) United States Patent
Drozt et al.

(10) Patent No.: US 9,392,576 B2
(45) Date of Patent: Jul. 12, 2016

(54) METHODS FOR TRANPORTING A PLURALITY OF MEDIA STREAMS OVER A SHARED MBMS BEARER IN A 3GPP COMPLIANT COMMUNICATION SYSTEM

(75) Inventors: Peter M. Drozt, Prairie Grove, IL (US); Michael F. Korus, Eden Prairie, MN (US); James E. Mathis, Barrington, IL (US); Donald G. Newberg, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 1039 days.

(21) Appl. No.: 12/981,226

(22) Filed: Dec. 29, 2010

(65) Prior Publication Data
US 2012/0170501 A1    Jul. 5, 2012

(51) Int. Cl.
*H04W 72/00* (2009.01)
*H04W 4/10* (2009.01)
*H04W 76/00* (2009.01)

(52) U.S. Cl.
CPC .............. *H04W 72/005* (2013.01); *H04W 4/10* (2013.01); *H04W 76/005* (2013.01)

(58) Field of Classification Search
CPC ... H04W 72/005; H04W 4/10; H04W 76/005; H04W 72/04
USPC ......... 370/276, 293, 310, 312, 315, 316, 319, 370/321, 322, 328, 329, 336, 342, 343; 455/403, 422.1, 450, 452.1, 455
See application file for complete search history.

(56) References Cited

U.S. PATENT DOCUMENTS

| 6,775,242 B2 | 8/2004 | Grilli et al. |
| 7,096,013 B1 | 8/2006 | Randai et al. |
| 7,286,554 B2 | 10/2007 | Beckmann et al. |

(Continued)

FOREIGN PATENT DOCUMENTS

| CN | 101325791 A | 11/2007 |
| EP | 1581014 A1 | 9/2005 |

(Continued)

OTHER PUBLICATIONS

Open Mobile Alliance Standard "OMA-TS-PoC_MULTICAST_PoC-V2.1-20091222-C"; Dec. 22, 2009; Sections 6 and 7; p. 23-27.

(Continued)

*Primary Examiner* — Obaidul Huq

(57) ABSTRACT

An infrastructure device in a 3GPP compliant system performs a method transporting a plurality of media streams over a shared MBMS bearer. The 3GPP compliant system includes a RAN partitioned into a plurality MBMS services areas, wherein each MBMS service area has at least one already existing shared MBMS bearers for transporting the media streams. The infrastructure device: receives a first request to transmit a first media stream to a first communication group; identifies a shared MBMS bearer in a first 3GPP MBMS service area that is already transporting a second media stream to a second communication group; and determines whether the shared MBMS bearer has sufficient capacity to transport both the first media stream and the second media stream simultaneously. When the shared MBMS bearer has sufficient capacity, the infrastructure device simultaneously sends both the first media stream and the second media stream on the shared MBMS bearer.

18 Claims, 8 Drawing Sheets

(56) References Cited

U.S. PATENT DOCUMENTS

| | | | |
|---|---|---|---|
| 7,738,423 B2 | 6/2010 | Khan | |
| 7,768,914 B2 | 8/2010 | Pauwels | |
| 7,924,723 B2 | 4/2011 | Johnson et al. | |
| 7,995,510 B2 | 8/2011 | Gao | |
| 8,085,783 B2 | 12/2011 | Zhou et al. | |
| 8,098,590 B2 | 1/2012 | Catovic et al. | |
| 8,135,418 B2 | 3/2012 | Ranganathan et al. | |
| 8,175,069 B2 | 5/2012 | Wang et al. | |
| 8,265,007 B2 | 9/2012 | Lee et al. | |
| 8,451,410 B2 | 5/2013 | Kim et al. | |
| 8,451,910 B1 | 5/2013 | Lohier et al. | |
| 8,576,763 B2 | 11/2013 | Gonsa et al. | |
| 8,625,606 B2 | 1/2014 | Drevo | |
| 9,167,479 B2 | 10/2015 | Gilbert et al. | |
| 2003/0088675 A1 | 5/2003 | Zheng | |
| 2003/0148779 A1 | 8/2003 | Aravamudan et al. | |
| 2003/0211859 A1 | 11/2003 | Chen et al. | |
| 2003/0232594 A1 | 12/2003 | Shaheen | |
| 2004/0184470 A1 | 9/2004 | Holden | |
| 2005/0227718 A1 | 10/2005 | Harris et al. | |
| 2005/0235289 A1 | 10/2005 | Barillari et al. | |
| 2005/0260997 A1 | 11/2005 | Korale et al. | |
| 2005/0276256 A1 | 12/2005 | Raitola et al. | |
| 2006/0034202 A1 | 2/2006 | Kuure et al. | |
| 2006/0111104 A1 | 5/2006 | Hyslop | |
| 2006/0212931 A1 | 9/2006 | Shull et al. | |
| 2007/0133527 A1 | 6/2007 | Kuure et al. | |
| 2007/0153727 A1 | 7/2007 | McBeath et al. | |
| 2007/0264992 A1 | 11/2007 | Maenpaa | |
| 2007/0266426 A1 | 11/2007 | Iyengar et al. | |
| 2007/0281722 A1* | 12/2007 | Gao | 455/518 |
| 2008/0102811 A1* | 5/2008 | Amirjoo et al. | 455/424 |
| 2008/0212583 A1* | 9/2008 | Rey et al. | 370/390 |
| 2008/0267109 A1 | 10/2008 | Wang et al. | |
| 2008/0293428 A1 | 11/2008 | Rey et al. | |
| 2008/0311892 A1 | 12/2008 | Lee et al. | |
| 2009/0080363 A1 | 3/2009 | Song et al. | |
| 2009/0080451 A1 | 3/2009 | Gogic | |
| 2009/0103466 A1 | 4/2009 | Gu et al. | |
| 2009/0113487 A1 | 4/2009 | Nanjunda Swamy | |
| 2009/0207773 A1 | 8/2009 | Feng et al. | |
| 2009/0245155 A1 | 10/2009 | Fukunaga et al. | |
| 2009/0303909 A1 | 12/2009 | Farhoudi et al. | |
| 2009/0323574 A1 | 12/2009 | Koskinen et al. | |
| 2009/0323638 A1 | 12/2009 | Catovic et al. | |
| 2010/0027541 A1 | 2/2010 | Eriksson et al. | |
| 2010/0061308 A1* | 3/2010 | Becker et al. | 370/328 |
| 2010/0081451 A1 | 4/2010 | Mueck et al. | |
| 2010/0128649 A1 | 5/2010 | Gonsa et al. | |
| 2010/0128722 A1 | 5/2010 | Madour et al. | |
| 2010/0157969 A1 | 6/2010 | Swamy et al. | |
| 2010/0222055 A1 | 9/2010 | Cho et al. | |
| 2010/0232340 A1 | 9/2010 | Godor et al. | |
| 2010/0265867 A1 | 10/2010 | Becker et al. | |
| 2010/0302988 A1 | 12/2010 | Becker | |
| 2010/0323698 A1 | 12/2010 | Rune et al. | |
| 2010/0332610 A1 | 12/2010 | Cherian et al. | |
| 2011/0077006 A1 | 3/2011 | Hsu | |
| 2011/0128903 A1 | 6/2011 | Futaki et al. | |
| 2011/0145846 A1 | 6/2011 | Kim | |
| 2011/0149830 A1 | 6/2011 | Kim et al. | |
| 2011/0149879 A1 | 6/2011 | Noriega et al. | |
| 2011/0151885 A1 | 6/2011 | Buyukkoc et al. | |
| 2011/0159880 A1 | 6/2011 | Kumar et al. | |
| 2011/0305183 A1 | 12/2011 | Hsu et al. | |
| 2011/0305184 A1 | 12/2011 | Hsu | |
| 2012/0008525 A1 | 1/2012 | Koskinen | |
| 2012/0014264 A1 | 1/2012 | Wang | |
| 2012/0033623 A1 | 2/2012 | Chu et al. | |
| 2012/0044907 A1 | 2/2012 | Mildh | |
| 2012/0082098 A1 | 4/2012 | Oprescu-Surcobe et al. | |
| 2012/0099505 A1 | 4/2012 | Wang et al. | |
| 2012/0170502 A1 | 7/2012 | Korus et al. | |
| 2012/0172028 A1 | 7/2012 | Korus et al. | |
| 2012/0176884 A1 | 7/2012 | Zhang et al. | |
| 2012/0230240 A1* | 9/2012 | Nebat et al. | 370/312 |
| 2012/0236776 A1 | 9/2012 | Zhang et al. | |
| 2012/0294220 A1 | 11/2012 | Gou | |
| 2013/0028118 A1 | 1/2013 | Cherian et al. | |
| 2013/0064160 A1 | 3/2013 | Newberg et al. | |
| 2013/0170421 A1 | 7/2013 | Wang et al. | |
| 2013/0301509 A1 | 11/2013 | Purnadi et al. | |
| 2014/0177436 A1 | 6/2014 | Korus et al. | |
| 2014/0177437 A1 | 6/2014 | Korus et al. | |
| 2014/0177506 A1 | 6/2014 | Korus et al. | |

FOREIGN PATENT DOCUMENTS

| | | |
|---|---|---|
| EP | 1 978 762 A1 | 10/2008 |
| EP | 2 109 281 A1 | 10/2009 |
| EP | 2 109 282 A1 | 10/2009 |
| EP | 2302969 A1 | 3/2011 |
| EP | 2 393 330 A1 | 12/2011 |
| EP | 2 427 030 A1 | 3/2012 |
| WO | 02089501 A1 | 11/2002 |
| WO | 03098871 A1 | 11/2003 |
| WO | 2006027006 A1 | 3/2006 |
| WO | 2008123824 A2 | 10/2008 |
| WO | 2009/042899 A1 | 4/2009 |
| WO | 2011000947 A1 | 1/2011 |
| WO | 2011068421 A1 | 6/2011 |

OTHER PUBLICATIONS

3GPP TS 26.346 V.9.4.0; "3rd Generation Partnership Project; Technical Specification Group Services and System Aspects; Multimedia Broadcast/Multicast Service (MBMS); Protocols and Codecs, Release 9"; Sections 5.4.1 and 8; Sep. 2010.

3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.

3GPP TSG RAN WG3 #59bis; "E-MBS Functions of Statistical Multiplexing"; R2-074339; Oct. 8-12, 2007; Shanghai, China; 8 Pages.

International Search Report and Written Opinion for related counterpart International Patent Application No. PCT/US2011/067354 mailed on Mar. 21, 2012.

International Search Report and Written Opinion for related counterpart International Patent Application No. PCT/US2011/066709 mailed on Jul. 6, 2012.

International Search Report and Written Opinion for related counterpart International Patent Application No. PCT/US2011/066705 mailed on Jan. 18, 2013.

3rd Generation Partnership Project (3GPP), "3GPP TS 26.246 V9.0. 0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Open Mobile Alliance: "Poc User Plane Approved Version 1.0.3," OMA-TS-PoC_UserPlane-V1_0_3-20090922-A, pp. 1-12, Sep. 22, 2009.

Open Mobile Alliance: "OMA PoC Control Plane Approved Version 1.0.3," OMA-TS-PoC_ControlPlane-V1_0_3-20090922-A, pp. 1-8, Sep. 22, 2009.

Rosenberg, J. et al., "SIP: Session Initiation Protocol," RFC 3261, Network Working Group Request for Comments, pp. 14, Jun. 1, 2002.

"Multimedia Broadcast and Multicast Services in 3G Mobile Netowrks," Alcatel Telecommunications Revenues, pp. 1-12, Apr. 1, 2004.

Non Final Rejection mailed Mar. 3, 2013 in related U.S. Appl. No. 12/981,374, Michael F. Korus, filed Dec. 29, 2010.

International Search Report and Written Opinion for related counterpart International Patent Application No. PCT/US20112/053051 mailed on Nov. 26, 2012.

Non Final Office Action mailed Oct. 26, 2012 in related U.S. Appl. No. 12/981,323, filed Dec. 29, 2010.

(56) References Cited

OTHER PUBLICATIONS

Non Final Office Action mailed Nov. 8, 2012 in related U.S. Appl. No. 12/981,274, filed Dec. 29, 2010.
Alexiou, A. et al., "MBMS Multicast Mode of UMTS," Retrieved from the Internet URL: http://ru6.cti.gr/ru6/publications/2148HCNDS2007_MBMS_Bouras.pdf on Jul. 21, 2014, pp. 1-33.
Ericsson et al., "MBMS Interest Indication for connected Ues," 3GPP Draft, R2-116190, 3rd Generation Partnership Project (3GPP), Mobile Competence Centre, vol. RAN WG2, No. San Francisco, USA, pp. 20111110-20111114, Nov. 8, 2011.
Hallahan, R. and Peha, J.M., "Policies for Public Safety Use of Commercial Wireless Networks," 38th Telecommunications Policy Reasearch Conference, Retrieved from the Internet URL: http://users.ece.cmu.edu/~peha/public_safety_priority_access.pdf on Jul. 21, 2014, pp. 1-34.
Hartung, F. et al., "MBMS—IP Multicast/Broadcast in 3G Networks," International Journal of Digital Multimedia Broadcasting, vol. 2009, (2009) Article ID 597848, pp. 1-25.
Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; Oct. 10, 2011, Oct. 26, 2011.
International Search Report for counterpart International Patent Application No. PCT/US2013/071828 mailed on May 13, 2014.
International Search Report for counterpart International Patent Application No. PCT/US2013/071837 mailed on May 13, 2014.
Non-Final Office Action mailed Mar. 1, 2013 in U.S. Appl. No. 12/981,274, Michael F. Korus et al., filed Dec. 29, 2010.
Non-Final Office Action mailed Apr. 17, 2014 in U.S. Appl. No. 13/231,530, Donald G. Newberg et al., filed Sep. 13, 2011.
Non-Final Office Action mailed Jun. 4, 2014 in U.S. Appl. No. 12/981,323, filed Dec. 29, 2010.
Notice of Allowance mailed May 21, 2014 in U.S. Appl. No. 13/724,098, Michael F. Korus et al., filed Dec. 21, 2012.
Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; Nov. 2, 2005.
Final Office Action mailed Apr. 25, 2013 in related U.S. Appl. No. 12/981,323, Michael F. Korus, filed Dec. 29, 2010.
Final Office Action mailed Sep. 23, 2013 in U.S. Appl. No. 12/981,274, Michael F. Korus, filed Dec. 29, 2010.
Digital Cellular Telecommunications System (Phase 2+), Universal Mobile Telecommunications System (UMTS); Mobile Application Part (MAP) Specification (3GPP TS 29, 002 Version 11.4.0 Release 11, Technical Specification, European Telecommunications Standards Institute (ETSI), Sophia-Antipolis, France, vol. 3GPP CT 4, No. V11.4.0, Published Oct. 1, 2012, pp. 1-1016.
Huawei "mbsfn-Areald Value range," 3GPP Draft; R2-100071 MBSFN-Areaid Value Range, 3rd Generation Partnership Project (3GPP), mobile competence centre, Sophia-Antipolis Cedex, France, vol. Ran WG2, no. Valencia, Spain; Jan. 18, 2010 Published Jan. 12, 2010, XP050420917.
Nokia Corporation, Nokia Siemens Networks, "Finalizing the open value ranges in SIB13", 3GPP Draft: R2-100213 Finalizing the Open Value Ranges in SIB13, 3rd Generation Partnership Project (3GPP), Mobile Competence Centre, Sophia-Antipolis Cedex, France published Jan. 12, 2010. vol. RAN WG2 No. Valencia Spain; Jan. 18, 2010.
Final Office Action mailed Oct. 23, 2014, in U.S. Appl. No. 12/981,323, Korus M.F. et al., filed Dec. 29, 2010.
Notice of Allowance mailed Feb. 4, 2015, in U.S. Appl. No. 12/981,323, Korus M.F. et al., filed Dec. 29, 2010.
Notice of Allowance mailed Mar. 12, 2015, in U.S. Appl. No. 12/981,323, Korus M.F. et al., filed Dec. 29, 2010.
Notice of Allowance mailed Aug. 11, 2014, in U.S. Appl. No. 13/724,098, Korus M.F. et al., filed Dec. 21, 2012.
Non-Final office Action mailed Oct. 9, 2014, in U.S. Appl. No. 13/724,039, Korus M.F. et al., filed Dec. 21, 2012.
Notice of Allowance mailed Feb. 11, 2015, in U.S. Appl. No. 13/724,039, Korus M.F. et al., filed Dec. 21, 2012.
Notice of Allowance mailed Aug. 11, 2014, in U.S. Appl. No. 13/231,530, Newberg D.G. et al., filed Sep. 13, 2011.
Notice of Allowance mailed Nov. 21, 2014, in U.S. Appl. No. 13/231,530, Newberg D.G. et al., filed Sep. 13, 2011.
Advisory Action mailed Dec. 10, 2013, in U.S. Appl. No. 12/981,274, Korus M.F. et al., filed Dec. 29, 2010.
Notice of Allowance mailed Jul. 23, 2014, in U.S. Appl. No. 12/981,274, Korus M.F. et al., filed Dec. 29, 2010.
Notice of Allowance mailed Aug. 21, 2014, in U.S. Appl. No. 12/981,274, Korus M.F. et al., filed Dec. 29, 2010.
Patent Examination Report No. 1 mailed Oct. 8, 2014, in Australian Patent Application No. 2011352443.
Notice of Grant mailed Mar. 5, 2015, in Australian Patent Application No. 2011352443.
Non-Final Office Action mailed Oct. 8, 2014, in U.S. Appl. No. 13/839,752, Gilbert S.S. et al., filed Mar. 15, 2013.
Final Office Action mailed Mar. 3, 2015, in U.S. Appl. No. 13/839,752, Gilbert S.S. et al., filed Mar. 15, 2013.
Advisory Action mailed May 20, 2015, in U.S. Appl. No. 13/839,752, Gilbert S.S. et al., filed Mar. 15, 2013.
Notice of Allowance mailed Aug. 6, 2015, in U.S. Appl. No. 13/839,752, Gilbert S.S. et al., filed Mar. 15, 2013.
International Search Report and Written Opinion for International Patent Application No. PCT/US2013/071802, mailed on Mar. 5, 2014.
Office Action mailed Jan. 22, 2015, in Canadian Patent Application No. 2,823,135.
Office Action mailed May 8, 2015, in European Patent Application No. 11 808 105.8, filed Dec. 22, 2011.
Office Action mailed Jan. 23, 2015, 2015, in European Patent Application No. 11 808 106.6, filed Dec. 22, 2011.
Office Action mailed May 19, 2015, in European Patent Application No. 11 808 106.6, filed Dec. 22, 2011.
Patent Examination Report No. 1 mailed Nov. 13, 2015, in Australian Patent Application No. 2013363627.
Office Action mailed Nov. 10, 2015, in European Patent Application No. 12 758 951.3, filed Aug. 30, 2012.
Intention to Grant mailed Mar. 6, 2015, in European Patent Application No. 11 811 621.9, filed Dec. 27, 2011.
Decision to Grant mailed Jun. 18, 2015, in European Patent Application No. 11 811 621.9, filed Dec. 27, 2011.

\* cited by examiner

US 9,392,576 B2

METHODS FOR TRANPORTING A PLURALITY OF MEDIA STREAMS OVER A SHARED MBMS BEARER IN A 3GPP COMPLIANT COMMUNICATION SYSTEM

REFERENCE TO RELATED APPLICATIONS

The present application is related to the following U.S. applications commonly owned together with this application by Motorola, Inc.:

Ser. No. 12/981,274, filed Dec. 29, 2010, titled "Methods for Binding and Unbinding a MBMS Bearer to a Communication Group in a 3GPP Compliant System" by Korus, et al.; and Ser. No. 12/981,323, filed Dec. 29, 2010, titled "Methods for Assigning a Plethora of Group Communications Among a Limited Number of Pre-Established MBMS Bearers in a Communication System" by Korus, et al.

TECHNICAL FIELD

The technical field relates generally to communication systems and more particularly to methods for transporting a plurality of media streams over a shared Multimedia Broadcast/Multicast Service (MBMS) bearer in a $3^{rd}$ Generation Partnership Project (3GPP) compliant system.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010.

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®. Many major carriers in the United States (US) and several worldwide carriers have started to convert their networks to LTE.

LTE and other 3GPP compliant systems (meaning systems having elements that operate in compliance with 3GPP TSs) also provide MBMS point-to-multipoint transport of media to user equipment (UE) operating on the system. Unfortunately, the MBMS transport mechanisms that are described in the 3GPP TSs have many shortcomings when compared to point-to-multipoint transport mechanisms offered by legacy narrowband systems. However, if organizations having more stringent requirements for media transport are going to realistically be able to use 3GPP technology, systems such as LTE systems will need to provide similar performance as the legacy systems, including similar performance for the point-to-multipoint mechanisms.

Accordingly, what is needed are some enhancements to the MBMS mechanisms of 3GPP compliant systems.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
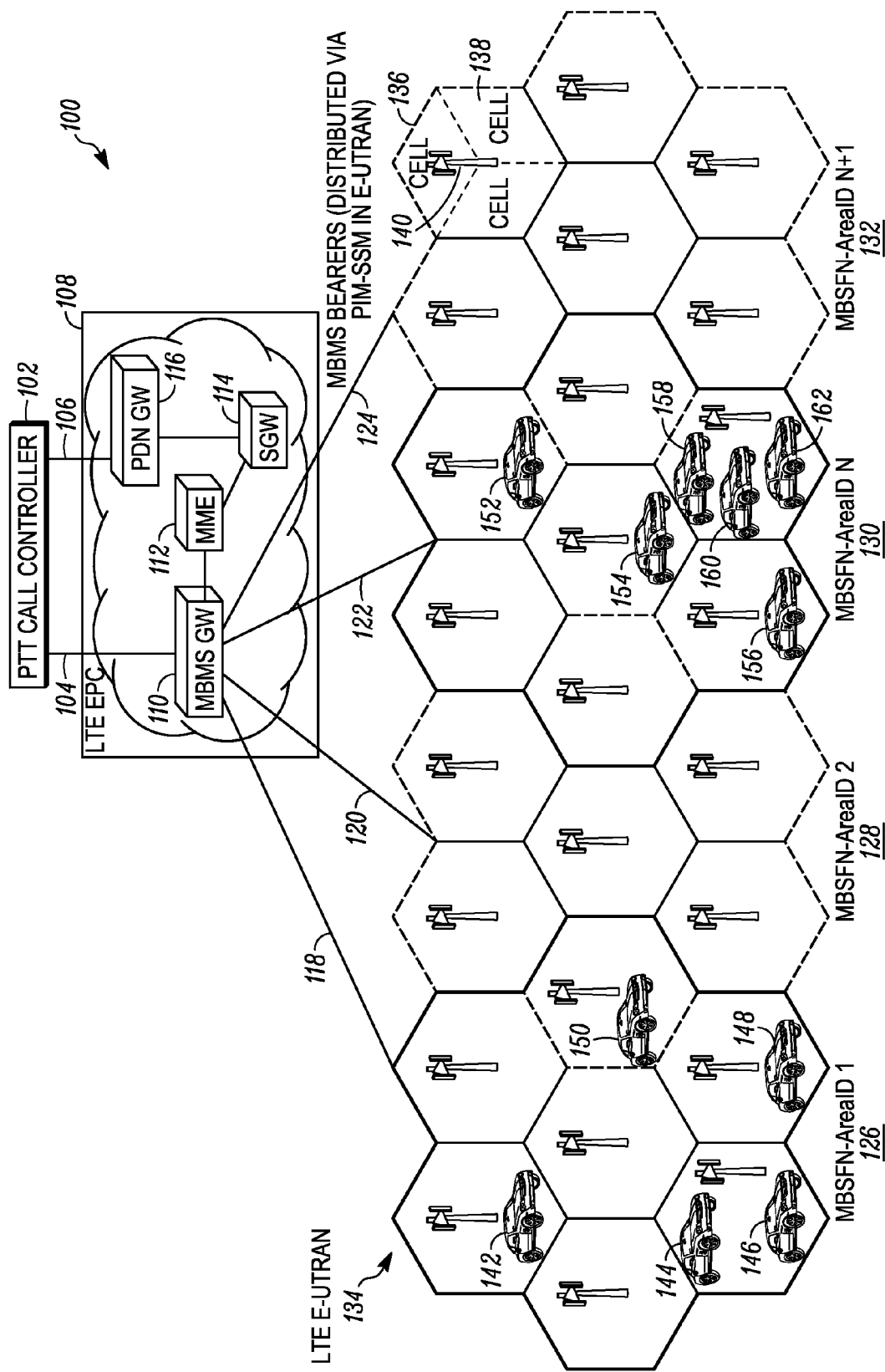
FIG. 1 is a system diagram of a 3GPP compliant communication system that implements methods for transporting a plurality of media streams over a shared MBMS bearer in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, an infrastructure device coupled to a 3GPP compliant system performs a method for simultaneously transporting multiple media streams over a shared MBMS bearer. The 3GPP compliant system includes a radio access network (RAN) partitioned into a plurality MBMS services areas, wherein each MBMS service area has at least one shared MBMS bearer established a priori for transporting media streams. The infrastructure device: receives a request to transmit a first media stream to a first communication group, wherein the request to transmit is received after the shared MBMS bearer was established; identifies a shared MBMS bearer in a first 3GPP MBMS service area that is already transporting a second media stream to a second communication group; and determines whether the shared MBMS bearer has sufficient capacity to transport both the first media stream and the second media stream simultaneously. When the shared MBMS bearer has sufficient capacity, the infrastructure device simultaneously sends both the first media stream and the second media stream on the shared MBMS bearer.

Pursuant to a further embodiment of the present disclosure, the infrastructure device sends on the MBMS bearer a first identifier that identifies the first media stream and a second identifier that identifies the second media stream to differentiate the first media stream from the second media stream on the shared MBMS bearer. A UE performs a method for receiving a media stream that is being simultaneously transported with at least one other media stream over a shared 3GPP MBMS bearer. Accordingly, the UE, which is a member of a first communication group: receives a MBMS bearer identifier that identifies a shared 3GPP MBMS bearer that is used to simultaneously transport a first media stream of the first communication group and a second media stream of a second communication group, wherein the first media stream is identified by a first communication group identifier and the second media stream is identified by a second communication group identifier; locates the shared 3GPP MBMS bearer using the MBMS bearer identifier; and differentiates the first media stream from the second media stream on the 3GPP MBMS bearer using the first communication group identifier in order to process the first media stream.

Referring now to the drawings, and in particular FIG. 1, a communication system in accordance with some embodiments is shown and indicated generally at 100. System 100 includes system elements of: an infrastructure device 102 such as an application server (that is illustrated as a Push-to-Talk (PTT) Controller); and an LTE Evolved Packet Core (EPC) 108 (having a Mobility Management Entity (MME) 112, a MBMS Gateway (MBMS GW) 110, a Serving Gateway (SGW) 114, and a Packet Data Network Gateway (PDN GW) 116 with other elements of an LTE EPC not included for ease of illustration such as a Broadcast Multicast Service Center (BM-SC) which could be located within the EPC or alternatively within the application server. System 100 further includes elements of: an access network (in this case an LTE Evolved Universal Terrestrial Radio Access Network (E-UTRAN)) 134 that includes a plurality of eNodeB (LTE base station) infrastructure devices (with one labeled as 140); and a plurality of UE 142, 144, 146, 148, 150, 152, 154, 156, 158, 160, 162. In general, the EPC and the E-UTRAN are referred to collectively as the LTE system. The elements of communication system 100 and the interfaces between them are further described below.

The E-UTRAN 134 elements, EPC 108 elements, PTT call controller 102, and UE 142 to 162 implement protocols and signaling in compliance with 3GPP TSs (including, but not limited to, 3GPP TSs 26.346 and 23.246, which describe aspects of 3GPP MBMS); and the terms LTE communication system, LTE system, and Evolved Packet System (EPS) are used interchangeably herein and are each defined as being inclusive of the E-UTRAN 134 and the EPC 108 but not inclusive of the PTT call controller 102 or the UE. Moreover, only a limited number of EPC elements and UE, and one PTT call controller and E-UTRAN are shown in the diagram, but more such elements may be included in an actual system implementation. Also, the E-UTRAN can be any type of access network, including any 3G, e.g., UMTS, or 4G e.g. WiMAX, access network, or WiFi.

In general, the UE, the PTT call controller 102, the EPC 108 logical elements, and the E-UTRAN 134 elements are each implemented using (although not shown) a memory, one or more network interfaces, and a processing device that are operatively coupled, and which when programmed form the means for these system elements to implement their desired functionality, for example as illustrated by reference to the methods and diagrams shown in FIGS. 2-8. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the PTT call controller 102, the EPC 108 logical elements, and the E-UTRAN 134 elements may be programmed with software or firmware logic or code for performing functionality described by reference to FIGS. 2 to 8; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods and signaling diagrams illustrated by reference to FIGS. 2 to 8. The UE 142, 144, 146, 148, 150, 152, 154, 156, 158, 160, 162, are also referred to in the art as subscribers, communication devices, access devices, access terminals, mobile stations, mobile subscriber units, mobile devices, user devices, and the like. Although illustratively shown in FIG. 1 as a device used in a vehicle, the UE can be any type of communication device such as radios, mobile phones, mobile data terminals, Personal Digital Assistants (PDAs), laptops, two-way radios, cell phones, and any other device capable of operating in a wired or wireless environment and that can be used by a user in the system.

Infrastructure device 102 is an intermediary device that facilitates transport of media (e.g., voice, data, video, etc.) from one or more source applications to one or more destination devices (such as members affiliated with a communication group, such as a talkgroup) over the LTE system. As such, the application server may be, for instance, a computer aided dispatch (CAD) server, a media server, a call controller, etc. In one illustrative embodiment, infrastructure device 102 is an application server in a packet data network providing application layer services to UE connected to the E-UTRAN 134 that are authorized and have the capabilities to use these services. In this instance infrastructure device 102 is a PTT call controller providing PTT services to the UE. Other services may include, for example, PTV (Push-to-Video) services, PTX (Push-to-anything) services, etc.

In one illustrative embodiment, the PTT call controller 102 communicates with the UE using control signaling described in OMA-TS-PoC_ControlPlane-V1_0_3-20090922-A and OMA_TS_PoC_UserPlane-V1_0_3-20090922-A (and any subsequent revisions, hereinafter referred to as the OMA PoC TS), which defines the procedures of a Push-to-Talk Over Cellular (PoC) Client (e.g., the UE) and a PoC Server (e.g., the PTT call controller 102). The OMA PoC TS references Session Initiation Protocol (SIP) (for example as described in Internet Engineering Task Force (IETF) Request for Comments (RFC) 3261 dated June 2002, and any subsequent revisions) as an enabling control protocol for requests for initiating and ending media transmissions and other control signaling. Therefore, some aspects of the present teachings are described by reference to protocols and message structures described in the OMA PoC TS. However, the present teachings are not limited to the use of OMA PoC but can be extended to other protocols both standard and proprietary.

The EPC 108 is an all-IP core network that provides mobile core functionality that, in previous mobile generations (2G, 3G), has been realized through two separate sub-domains: circuit-switched (CS) for voice and packet-switched (PS) for data. The EPC 108 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 108 comprises the logical components of the MME 112, the MBMS GW 110, the SGW 114, and the PDN GW 116 and further comprises the, respective, interfaces (also referred to in the art as reference points) between these logical entities. The logical entities of the EPC 108 are shown as separate logical blocks and indeed can, in some embodiments, each be included in separate hardware devices or can, alternatively, be combined in one or more hardware devices. Also, the EPC 108, depending on the size of the network, may have several such components serving thousands or tens of thousands of UE and serving many application servers. Additional known elements and interfaces in an EPC as described in the 3GPP TSs for LTE that are needed for a practical embodiment of the EPC 108 are not shown in FIG. 1 for the sake of clarity.

Turning first to the MME 112, this EPC element is the key control-node for UE access on the LTE system. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown), and the MME 112 is also responsible for generation and allocation of temporary identities or identifiers to UE.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic, which is referred to herein as a MBMS bearer and is defined in the 3GPP TSs for MBMS and is, thus, also referred to herein as a 3GPP MBMS bearer. A MBMS bearer is generally associated with a service (and is therefore also referred to in the art as a MBMS service); and each MBMS bearer is identified using a unique (i.e., different) identifier, which in the 3GPP TSs is called a Temporary Mobile Group Identity (TMGI). Between the eNodeB and the UE, the MBMS bearer takes the form of a Multicast Traffic Channel (MTCH), with the traffic associated to a specific TMGI being carried by a specific MTCH at any given time.

Accordingly, a bearer can be point-to-point (PTP) (such as a unicast bearer), or a PTM bearer (such as a MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 110 is an entry point in the LTE system from an application server via a reference point 104, and it distributes MBMS traffic to all eNodeBs within MBMS service areas. MBMS may use Single Frequency Network (SFN) transmission, also referred to as MBSFN. In MBSFN, or more particularly in a given MBSFN geographic area, the MBMS transmission happens from a time-synchronized set of eNodeBs in the service area, using the same resource blocks. IP multicast can be used for distributing the traffic from the MBMS GW 114 to the different eNodeBs. Moreover, in an embodiment, media is delivered from the LTE EPC (via the MBMS-GW 110) to the eNodeBs in each MBSFN Area of the E-UTRAN 134 using Protocol-Independent Multicast source-specific multicast (PIM-SSM), as illustrated by links 118, 120, 122, and 124.

As described in the 3GPP TSs, a RAN such as the LTE E-UTRAN 134 can be partitioned into one or more MBMS service areas, with each MBMS service area covering a particular geographical area in which MBMS transmissions to the UE can occur. A MBMS service area can be further partitioned into one or more MBSFN Areas each identified by a MBSFN Area ID. Further, each MBSFN Area generally includes a plurality of cells, wherein a cell is defined as being inclusive of a single eNodeB's coverage area or a portion of an eNodeB's coverage area and can be identified by a cell identifier. As used herein, however, the terms "MBMS service area" and "MBSFN area" are used interchangeably since, in the described embodiment, the MBMS service area and MBSFN area have a one-to-one correspondence. However, this is meant only to be illustrative and to provide a simple embodiment for ease of understanding, and is in no way meant to limit the scope of the present teachings. As such, the present teachings also apply to a logical partitioning of the LTE E-UTRAN 134 where there is a one-to-many correspondence between the MBMS service area and MBSFN area.

The SGW 114 routes and forwards user point-to-point data packets, while also acting as the mobility anchor for the user plane during inter-eNodeB handovers and as the anchor for mobility between LTE and other 3GPP technologies. There are also links between the SGW 114 and the eNodeBs for transporting media that are not shown in FIG. 1 for the purpose of simplifying the diagram. The PDN GW 116 provides connectivity to the UE to external packet data networks (PDNs) by being the point of exit and entry of traffic for the UE via a reference point 106. A UE may have simultaneous connectivity with more than one PDN GW for accessing multiple PDNs. The PDN GW 116 performs policy enforcement, packet filtering for each user, charging support, lawful interception and packet screening using policy and charging rules provided by a Policy and Charging Rules Function (PCRF), which is not shown. Another key role of the PDN GW 118 is to act as the anchor for mobility between 3GPP and non-3GPP technologies such as WiMAX and 3GPP2 (CDMA 1X and EvDO).

E-UTRAN 134 comprises multiple cells each served by an eNodeB. As shown in FIG. 1, LTE E-UTRAN 134 includes many eNodeBs (one such eNodeB labeled as 140); each having roughly the same coverage area 136 and that each comprises three cells 138. The eNodeBs serve as the intermediate infrastructure device between the UE and the EPC 108 and a point of access for the UE to assigned or allocated bearers. Each cell represents a geographic coverage area that provides the wireless resources termed herein as bearers for carrying data (or SDFs) for UE connected to the E-UTRAN. Although in this illustrative implementation, each eNodeB coverage area comprises three cells, the number of cells per eNodeB coverage area may be more than three and as few as one.

Furthermore, the LTE EUTRAN 134 comprises a plurality of (in this example four) MBSFN Areas 126, 128, 130, and 132 each having the same number (seven) of eNodeB coverage areas and corresponding number of cells (21). As shown in FIG. 1, the MBSFN areas partially overlay (for example the UE 150 is located in an eNodeB coverage area that is included in MBSFN areas 126 and 128). However, at least some (or all) of the MBSFN areas could have mutually exclusive geographically boundaries.

In accordance with one embodiment of the present disclosure, for example as described by reference below to FIG. 2, an infrastructure device (e.g., the PTT controlled 102) operates to simultaneously transport media streams for multiple communication groups over a shared MBMS bearer, wherein a communication group is defined as a group of member devices and/or users that become associated or affiliated with the group for the purposes of receiving one or more common media streams. The common media steams may be any type of media; and where the media distributed is voice, the communication group is referred to as a "talkgroup".

At least one shared MBMS bearer is established a priori in each MBMS service area (i.e., in each MBSFN Area), meaning that the MBMS bearers are "pre-established" or already established before the PTT call controller 102 receives any requests to transmit media over the EPS to a communication group. Usually a single MBMS bearer per MBMS service area will suffice, though there may be cases when multiple MBMS bearers may be used. For example, one MBMS bearer could be used for all Agency A talkgroups and a second MBMS bearer could be used for all Agency B talkgroups when both agencies share a MBMS service area and it would be undesirable for all these talkgroups to compete for resources from the same MBMS bearer. How the MBMS bearers are established is immaterial, and thus any suitable protocol can be used for bearer establishment depending on the network implementation including, but not limited to, the PTT call controller initiating MBMS Session Start procedures as defined in, for example, 3GPP TS 23.246 v. 9.5.0, dated June 2010, and subsequent revisions.

Accordingly, the shared MBMS bearers for transporting media streams are established a priori (e.g., at system initialization) and capacity of each shared MBMS is held in reservation until time of PTT invocation (via a request for media transmission), wherein a subset (usually) of the total capacity of the shared MBMS bearer can be assigned to transport media for a given communication group. In other words, a shared MBMS bearer is not established exclusively for a specific application service at the time of application invocation; rather each shared MBMS bearer is established a priori and represents a limited amount of bandwidth resources which the PTT call controller can simultaneously assign to multiple talkgroups upon PTT requests.

That a MBMS bearer is "shared" means that the media streams from two or more communication groups can be simultaneously sent on the same MBMS bearer. In other words, sending multiple media streams on a shared MBMS bearer "simultaneously" means that, at the application layer (i.e., using application layer processing), the infrastructure device 102 multiplexes packets of the multiple media streams for sending over the shared MBMS bearer. When there is sufficient capacity on the shared MBMS bearer, this multiplexing is done without dropping packets from any of the media streams. As used herein, the application layer is defined as the highest layer in both the OSI (Open Systems Interconnection) networking model in the Transport Control Protocol (TCP)/IP protocol stack, e.g., as described in RFC 1122 dated October 1989, and any subsequent revisions. In OSI, the Application layer (layer 7) is right above the presentation layer (layer 6); and in the TCP/IP stack, the application layer (layer 4 in RFC 1122) is right above the transport layer (layer 3).

The capacity or size of a shared MBMS bearer means the amount of radio frequency (RF) resources (and corresponding bandwidth) that is allocated to the shared MBMS bearer. Capacity can be measured or determined in any suitable manner; for instance, the PTT call controller 102 can determine capacity based on a number of kilobits, which in turn measures how many packets can be transported on the shared MBMS bearer. In one illustrative implementation, the capacity of a shared MBMS bearer can be sized or set based at least in part on a maximum number of simultaneously transported media streams and the bit rate of those streams as well as the mix of media codecs (and associated bit rates) expected to be used.

In other words, the capacity of a shared MBMS bearer is sized to transport a first plurality of media streams having the same minimum bit rate and a second smaller plurality of media streams having the same maximum bit rate, wherein the maximum bit rate is larger than the minimum bit rate. For example, a single shared MBMS bearer could be sized to simultaneously support up to ten media streams each sent using a low bit-rate codec (e.g., 8 kbit/s) or five simultaneous media streams sent using a high-bit rate codec (e.g., 64 kbits/s) or any combination in between.

In order for multiple media streams to share a common MBMS bearer the management of the resources allocated to the shared MBMS bearer become important. The PTT call controller 102 is made aware of the amount of bandwidth or capacity available for all of the shared MBMS bearers that it will manage. This enables the call controller to track how these bearers are being used, to ensure that the number of active media streams does not overrun the resources.

Figure 2:
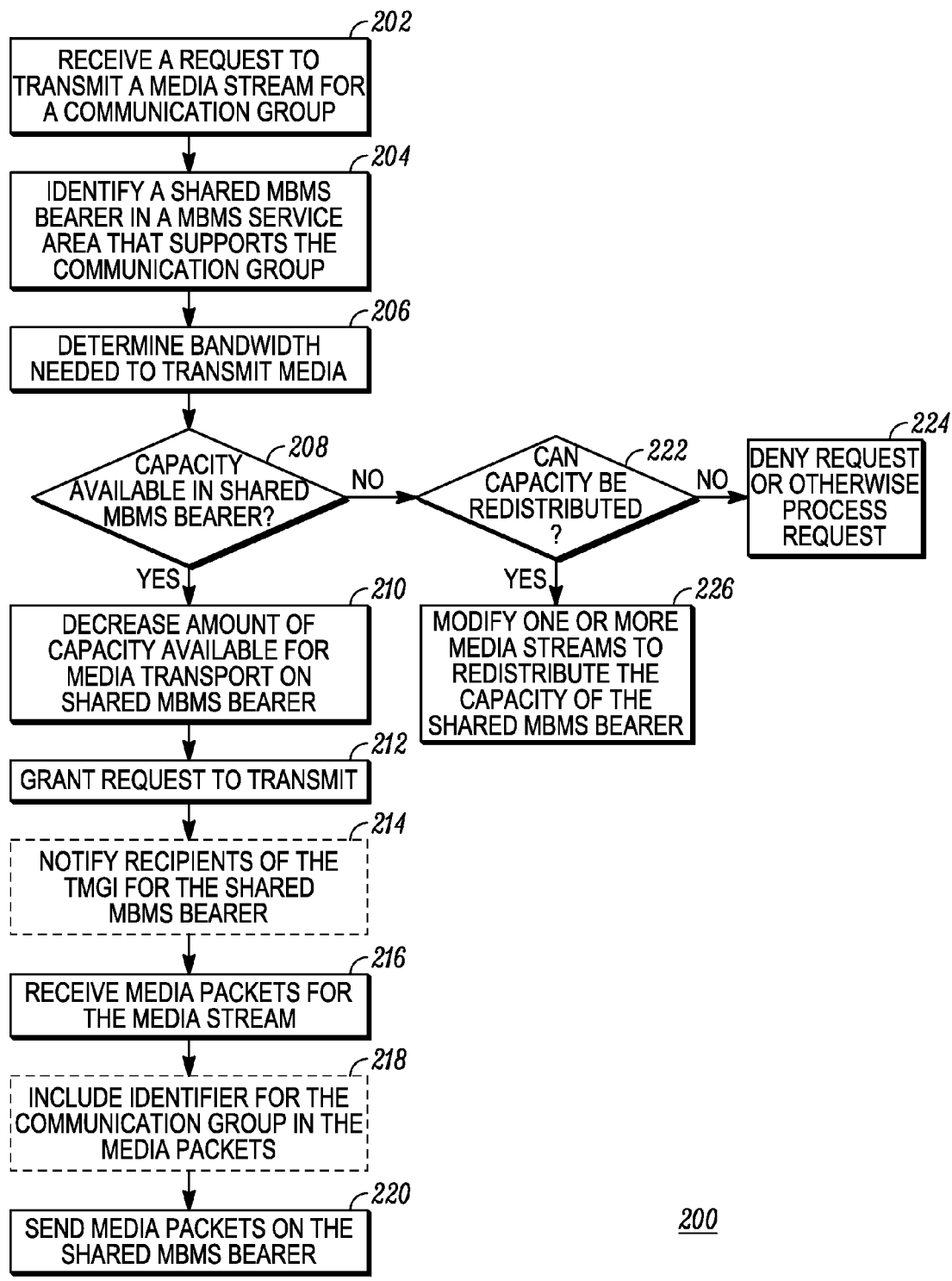
FIG. 2 is a flow diagram illustrating a method performed by an infrastructure device for transporting a plurality of media streams over a shared MBMS bearer in accordance with some embodiments.
Figure 3:
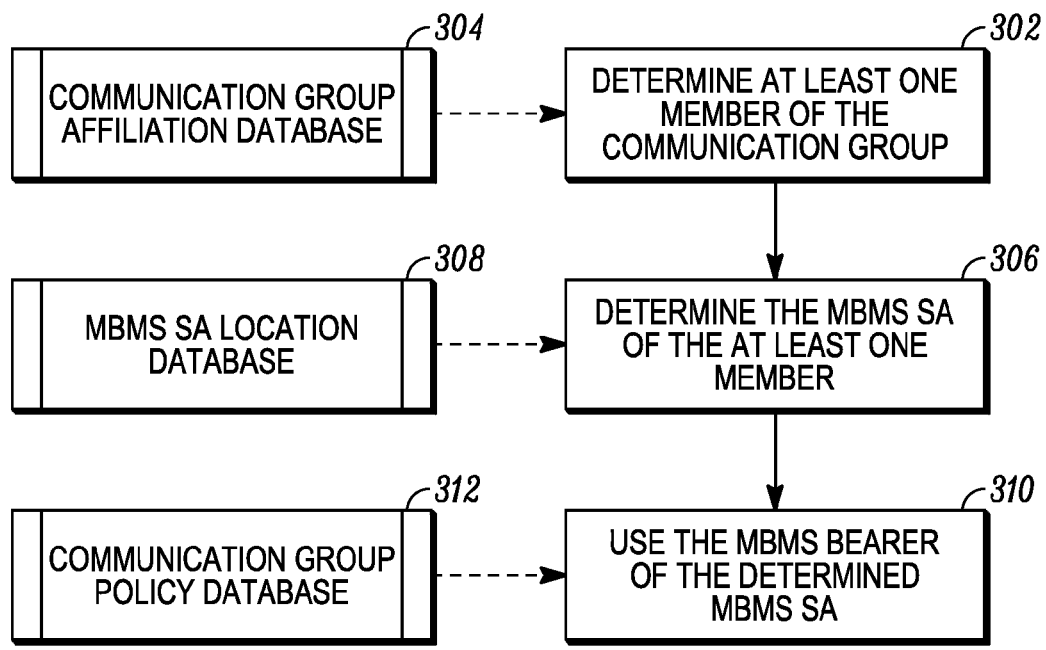
FIG. 3 is a flow diagram illustrating a method performed in an infrastructure device for selecting a shared MBMS bearer in accordance with some embodiments.

Turning now to FIG. 2, a flow diagram illustrating a method for transporting a plurality of media streams over a shared MBMS bearer in a 3GPP compliant system is shown and generally indicated at 200. The functionality illustrated by method 200 is performed in an infrastructure device such as the PTT call controller 102. In accordance with the method 200, at 202, the PTT call controller 102 receives a request to transmit a media stream to a communication group that is identified by a communication group identifier. Let's say, for example, the communication group includes all of the UE 152, 154, 156, 158, 160, and 162 located in MBMS service area 130, shown in FIG. 1.

The request can take any suitable message format as determined by the call control protocols being implemented in the system. In this case, wherein OMA PoC is implemented, the request is an OMA PoC PTT request that is communicated using floor control signaling, for instance in a Talk Burst Control Protocol (TBCP) message, from a PTT client affiliated with a particular communication group that is identified by a talkgroup identifier, for instance. However, in an alternative embodiment, the PTT request could be communicated by way of a SIP INVITE message.

The PTT call controller could identify or use an available pre-established shared MBMS bearer in every MBMS service area (e.g., 126, 128, 130, 132) of the E-UTRAN 134 to transport the media stream to the communication group. However, this would undoubtedly waste resources, since at least some of the times there will not be any members of a given communication group in any of the MBMS service areas to receive the media on the assigned shared MBMS bearer. For example, for the illustrative communication group having member UE 152 to 162, if the PTT call controller 102 were to use resources of a shared MBMS bearer for the media stream in every MBMS service area, there would be three service areas, i.e., MBSFN areas 126, 128, and 132 where bearer resources at least for some portion of time are wasted because no members of the communication group area located in these service areas to receive the media for the communication group.

Therefore, in one embodiment, to conserve limited MBMS bearer resources, the PTT call controller 102 instead performs a procedure so that it intentionally identifies (204) those MBMS service areas in which the member UE are located. To this end, the PTT call controller 102 performs a method 300 as illustrated by reference to the flow diagram shown in FIG. 3. Accordingly, the PTT call controller 102 first determines (302) the members of the communication group. For example, a communication group affiliation database 304 is consulted that includes the current members (e.g., users and/or devices identified by any suitable identifier) of numerous communication groups identified by communication group (e.g., talkgroup) identifiers. Database 304 is populated in any suitable manner using both real-time techniques (e.g., the UE reporting its group affiliations during a registration procedure) for dynamically changing group membership, and pre-configuration for static group membership. Upon consulting the database 304, the PTT call controller 102 determines that the members of the communication group identified in the PTT request include UE 152 to 162.

The PTT call controller 102 determines (306) the MBMS services area or areas that include the members of the talkgroup (in this case MBMS service area 130), and then uses (310) a shared MBMS bearer in each MBMS service area(s) in which the members are located. In one example implementation, the PTT call controller 102 consults a MBMS service area location database 308 that maintains information regarding the one or more (if overlapping) MBMS service areas in which each UE in the LTE-UTRAN 134 is located, for example by associating a UE identifier with one or more MBFSN area IDs. In one illustrative implementation, the UE sends to the PTT call controller 102 a location update message that includes an identifier for the one or more MBMS services areas (e.g. a MBSFN-Area ID) in which the UE is located. The PTT call controller 102 uses the location update messages received by the UE to populate the MBMS service area location database 308. Upon consulting the database 308, the PTT call controller 102 determines that the members' devices 152 to 162 of the communication group identified in the PTT request are located in the MBMS services area 130 having identifier MBSFN-AreaID N.

The PTT call control 102 may also include other MBMS service areas in the set based on a policy determination. For instance, using input from a communication group policy database 312, the PTT call controller 102 determines other "critical" MBMS service areas to include in the set including, but not limited to, MBMS service areas that: provide coverage of a high crime area; provide coverage of a high use area (e.g., near a busy area); are adjacent to MBMS service areas where group members are located to make mobility transitions better; provide coverage where priority users may be located; etc. Once the relevant MBMS service area is determined, the PTT call controller 102 identifies and uses (204) the one or more MBMS bearers supporting that service area.

In one illustrative implementation, the PTT call controller 102 consults a resource management database that at a minimum contains a listing of all of the pre-established shared MBMS bearers in each MBMS service area, one or more communication group identifiers assigned to the shared MBMS (if an assignment has been made), and the capacity of the shared MBMS that is utilized by the communication groups. The resource management database can be populated at least in part by the PTT call controller 102 as it assigns and de-assigns the capacity of the pre-established shared MBMS bearers. The resource management database can also be populated at least in part using information from the LTE-E-UTRAN (or other applications that monitor such information) when shared MBMS bearers are available, for example if new MBMS bearers are added (or removed) from the listing of pre-established MBMS bearers for a given MBMS service area.

Figure 4:
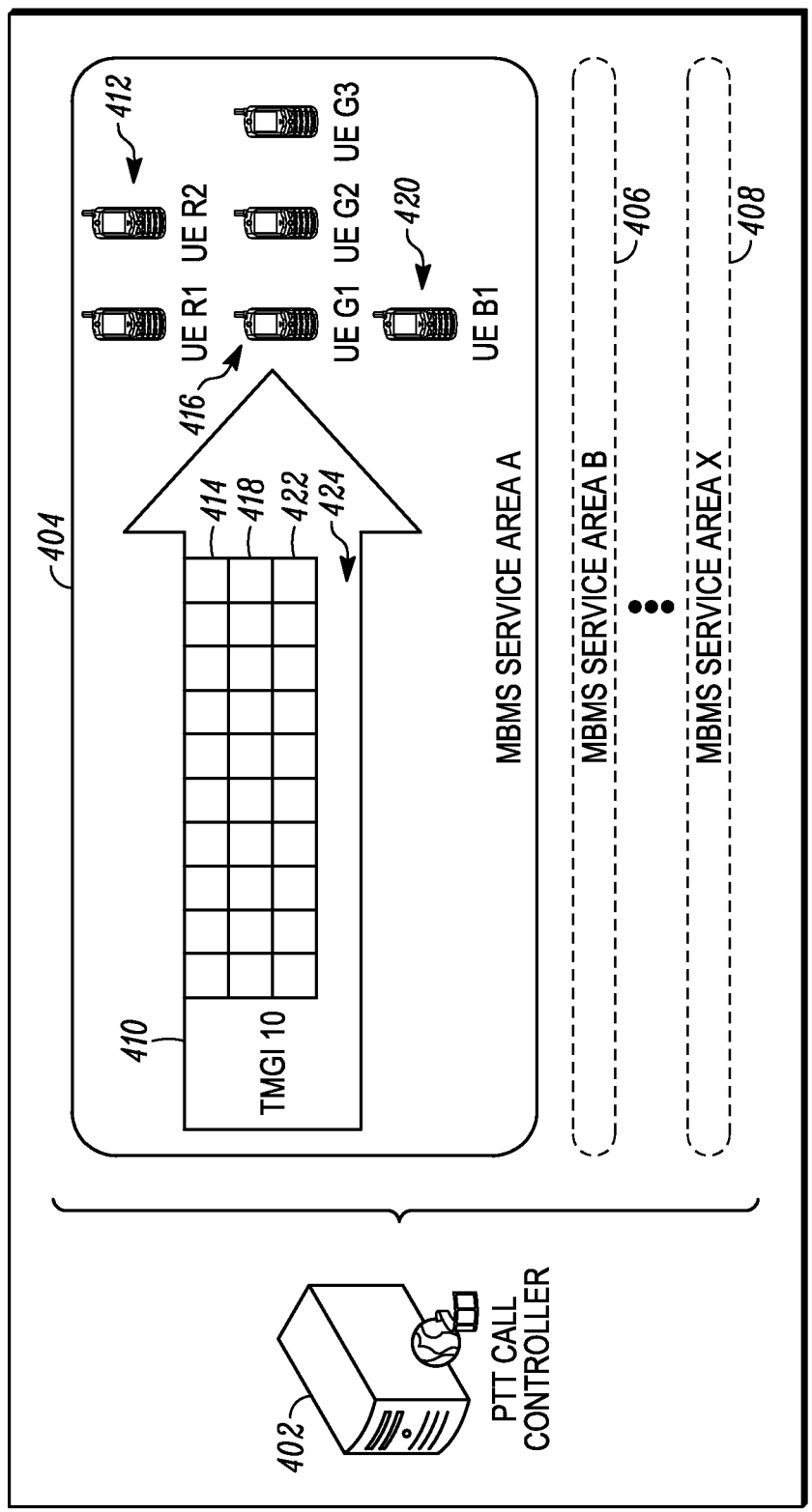
FIG. 4 is a pictorial diagram illustrating a plurality of media streams being transported over a shared MBMS bearer in accordance with some embodiments.

Let's say in this case, that the PTT call controller 102 identifies a MBMS bearer in MBMS service area 130 that is already transporting one or more (in this case three) media streams to other communication groups. Pictorially, a shared MBMS Bearer supporting multiple media streams is illustrated in FIG. 4. Shown therein is a PTT call controller 402 managing a shared MBMS bearer in each MBMS service area A (404), B (406) through X (408). A large arrow 410 represents RF resources allocated to a single shared MBMS bearer identified by TMGI 10 for MBMS service area A. As shown, three media stream transmissions 414, 418, 422 are active and being sent simultaneously on the shared MBMS bearer 410.

While each UE R1, R2, G1, G2, G3, and B1 receive all the packets for all of the media streams, each UE has capabilities to filter out media packets not needed and only process those media packets appropriate for the communication group in which the UE is currently participating. Details of this "filtering" process are explained below by reference to FIG. 8. For example, members of a talkgroup 412 comprising UE R1 and R2 filter out and only process packets of the media stream 414 directed to that talkgroup. Members of a talkgroup 416 comprising UE G1, G2, and G3 filter out and only process packets of the media stream 418 directed to that talkgroup. Members of a talkgroup 420 comprising UE B1 filter out and only process packets of the media stream 422 directed to that talkgroup.

In FIG. 4, all of the media streams, 414, 418, and 422 have the same bit rate; however, this is not a requirement when using shared MBMS bearers. In fact, a benefit of using a shared MBMS bearer is the ability to transport media streams having different bit rates as illustrated by reference to FIG. 5. Shown therein is a PTT call controller 502 managing a shared MBMS bearer in each MBMS service area A (504), B (506) through X (508). A large arrow 510 represents RF resources allocated to a single shared MBMS bearer identified by TMGI 10 for MBMS service area A. As shown, three media stream transmissions 514, 518, 522 are active and being sent simultaneously on the shared MBMS bearer 510. Members of a talkgroup 512 comprising UE R1 and R2 filter out and only process packets of the media stream 514 directed to that talkgroup. Members of a talkgroup 516 comprising UE G1, G2, and G3 filter out and only process packets of the media stream 518 directed to that talkgroup. Members of a talkgroup 520 comprising UE B1 filter out and only process packets of the media stream 522 directed to that talkgroup.

Figure 5:
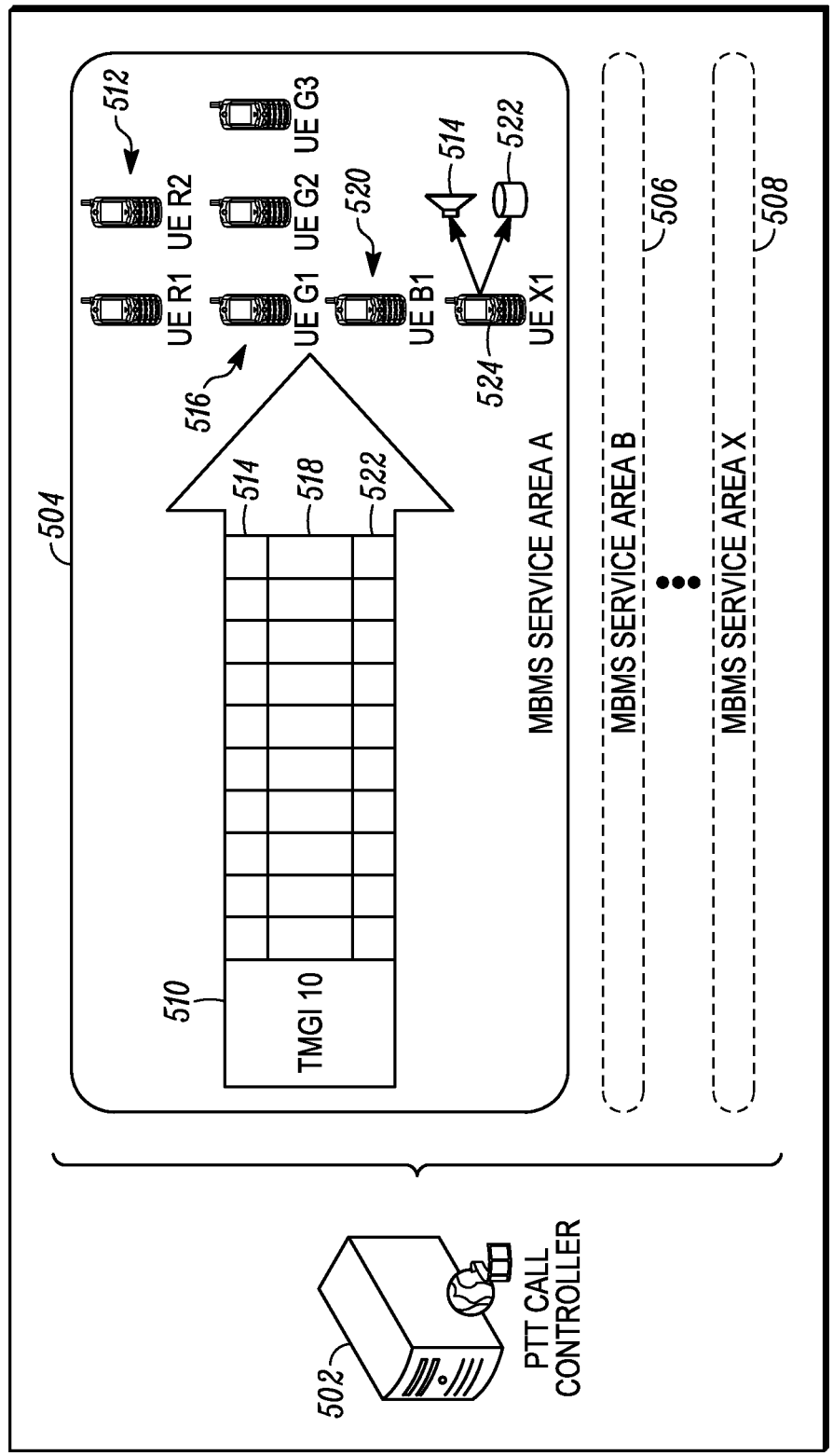
FIG. 5 is a pictorial diagram illustrating a plurality of media streams being transported over a shared MBMS bearer in accordance with some embodiments.

Further shown in FIG. 5, media streams 514 and 522 have the same bit rate, but media stream 518 has a higher bit rate, as demonstrated by the heights of those media streams. Since there are no constraints regarding the mix of bit rate media streams within a shared MBMS bearer, different bit rate encoders is easily supported using the shared MBMS server. As a simple example, assume the media stream 518 for talkgroup 516 is generated using a codec which requires twice the bandwidth of the codecs used by source UE of the media stream 514 for talkgroup 512 and the media stream 522 for talkgroup 520. With an individual fixed-sized bearer that is sized to support the smaller bandwidth media codecs, this larger bandwidth media codec could not be supported; or, alternatively, some MBMS Bearers would need to be created and dedicated to support the larger bit-rate. However, when that codec is not being used, resources are wasted.

Returning again to method 200 of FIG. 2, let's say that the PTT call controller 102, at 204, identified MBMS bearer 410 (having TMGI 10) in MBMS service area A (corresponding to MBMS service area 130) as the shared MBMS bearer that supports the talkgroup comprising UE 152-162. The PTT call controller 102 then determines the bandwidth (resources) needed to transmit the media stream to the UE 152-162 and determines (208) whether the shared MBMS bearer 410 has sufficient capacity (i.e., unused resources) to transport this additional media stream. As described above, the total amount of resources allocated to each shared MBMS bearer in each MBMS Service Area is known to the PTT call controller 102, and the PTT call controller also knows the resources that it has already assigned, if any, to the shared MBMS bearer (for instance by maintaining and consulting the resource management database, described above).

The PTT call controller 102 can also determine the bandwidth of the media stream. For instance, the bit rate of the codec may be included in an SDP (Session Description Protocol, as described in RFC 4566, dated July 2006, and any subsequent revisions) header of one or more media packets in the media stream. The controller could obtain the bit rate from negotiating with the UE or it may be a fixed value not included in the media stream. Using these two pieces of capacity information, the PTT call controller 102 determines (208) whether the shared MBMS bearer contains sufficient capacity to add another media to the MBMS bearer.

For example, referring again to FIG. 4, the PTT call controller determines that there is a remaining capacity 424 in the shared MBMS bearer 410. If the request to transmit media received at 202 is for a talkgroup having UE (including the source or requestor UE) using the same bit rate as is used to source the other media streams, the PTT call controller determines there are sufficient resources available to support the new media stream. In other words, the PTT call controller can use application layer processing to multiplex all four media streams 414, 418, 422, and 424 into a coordinated or multiplexed media stream for simultaneous transmission of the media streams over the MBMS bearer 410 without having to drop packets from any of the media streams.

Continuing with the method 200, when sufficient resources are available, the PTT call controller 102 decreases (210) the amount of capacity available within the shared MBMS bearer by accounting for the resources that will be used for the new media stream. The PTT call controller 102 then grants (212) the request, for instance using call control signaling, e.g., a Call Grant message to the PTT requestor and a Call Taken message to the other group members, as described in the OMA PoC TS, e.g., OMA-TS-PoC_UserPlane-V1_0-3-20090922-A. The PTT call controller begins receiving (216) corresponding media packets (of the new media stream) from the media source and broadcasts (220) the media packets on the shared MBMS bearer 410 along with the media packets corresponding to the other active media streams 414, 418, and 422. Forwarding (220) the packets entails replicating the media stream and delivering it to the MBMS service areas (for example, MBSFN area 130) by transmitting the replicated media packets to an IP Multicast addresses corresponding to the assigned MBMS bearers.

In an embodiment, the PTT call controller further notifies (214) the recipient group members of an identifier for the shared MBMS bearer. In one illustrative implementation, the identifier for the shared MBMS bearer comprises a TMGI and/or an IP multicast address; and the TMGI and/or IP multicast address identifying the shared MBMS bearer in each MBMS service area is static. Therefore, each UE can discover or be notified (214) of the appropriate TMGI/IP multicast address in a MBMS service area in a number of ways. For example, it could be conveyed in the signaling used to transmit a new media stream (such as a SIP INVITE request or a Call Taken message). Alternatively, the UE can be informed of the TMGI/IP multicast address in a particular MBMS service area as part of the procedure that manages UE entering the MBMS service area; or TMGIs/IP multicast addresses can be configured in the UE through device management or an equivalent process.

Moreover, in an implementation where there are multiple shared MBMS bearers per MBMS service area, the TMGI/IP multicast address of the assigned bearer could be sent in floor control signaling to the PoC client sending the PTT request (i.e., the PTT requestor) and to the other group members notifying the corresponding UE (and users) that a session is granted in response to the PTT request. For example, the floor control signaling comprises a Call Grant message to the PTT requestor and a Call Taken message to the other group members. In another implementation, the TMGI of the assigned shared MBMS bearer is sent to the UE of the communication group on a special pre-established downlink MBMS bearer for broadcasting control information such as bearer assignments.

Optionally, the PTT call controller 102 includes (218) the communication group and/or a media stream identifier in the received media packets (216) before sending (220) the media packets over the MBMS bearer. The identifier could be inserted into the media stream by the source UE and forwarded by the PTT call controller or inserted into the media stream by the PTT call controller. Thus, with respect to FIG. 4, a different talkgroup identifier for each of the media streams 414, 418, 422, and the new media stream using capacity 424 is included in the corresponding packets of those media streams to differentiate these media stream packets from one another. Accordingly, the recipient UE can use the respective identifiers to filter from the shared MBMS bearer 410 and process only the media stream for their talkgroup.

Moreover, the use of the talkgroup identifiers also enables a UE to differentiate and process multiple media streams for the same talkgroup. For example, turning again to FIG. 5, a UE X1 (524) filters and processes both media streams 514 and 522 using the respective talkgroup identifiers included in the media packets of those media streams. For example, if this UE has interest in receiving media from multiple talkgroups at the same time, it may begin rendering the media stream 514 for the talkgroup 512 and immediately switch to rendering the media stream 522 for the talkgroup 520 when it becomes active. In this example, the UE does not rely on any additional signaling from the PTT call controller to perform these actions.

If sufficient bandwidth is not available in the shared MBMS bearer, the server determines (222) if resources can be made available by redistributing the resources used to support the currently active media streams, for example by modifying (226) one or more of the media streams currently being transmitted or requested to be transmitted on the shared MBMS bearer. Modifying the one or more media streams can consist of adjusting the bandwidth of the media streams by changing bit rates (i.e., causing the bit rate of one or more of the active media streams to be lowered) or selectively dropping media packets, at the application layer. The modifying may also include selecting the correct media format to align all of the media streams for sending on the shared MBMS bearer.

For example, the PTT call controller: receives a request to transmit a new media stream to a communication group; identifies a shared MBMS bearer (in the supporting MBMS service area) that is already transporting other media streams; determines that the shared MBMS bearer has insufficient capacity to transport all of the media streams simultaneously; and, thus, modifies any combination of the current or the new media streams in order to multiplex, at the application layer, packets of all of the media streams into a multiplexed media stream that identifies the shared MBMS bearer. Moreover, once any one of the media streams is no longer being transported on the shared MBMS bearer, the PTT call controller may readjust a given media stream (e.g., raise the bit rate) back to what it was prior to adding the new media stream.

Figure 6:
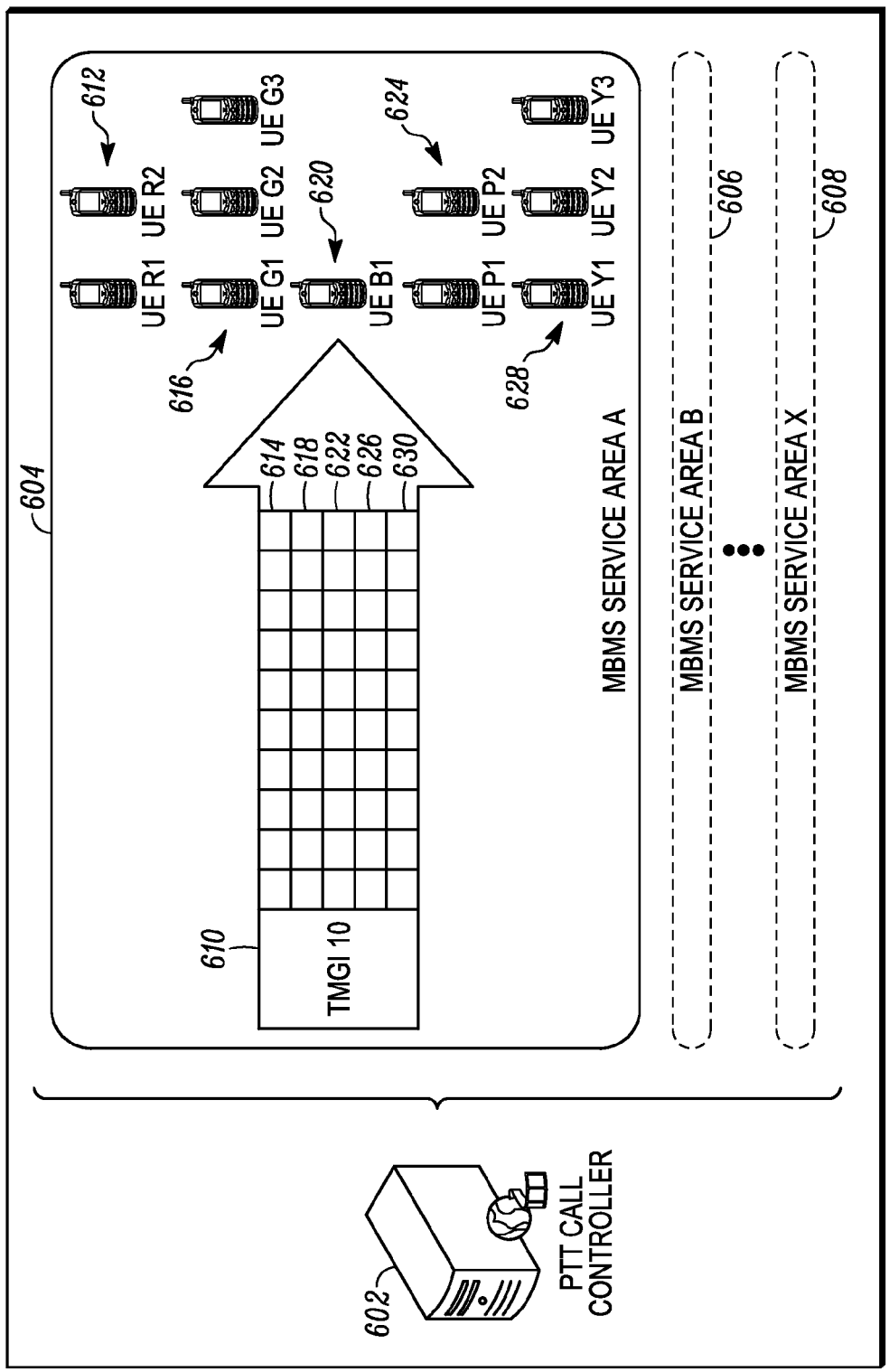
FIG. 6 is a pictorial diagram illustrating a plurality of media streams being transported over a shared MBMS bearer in accordance with some embodiments.

FIG. 6 illustrates a PTT call controller that lowers the bit rates of media streams to accept and assign a new media stream to a MBMS bearer that initially did not have sufficient capacity to transport the new media stream. For example, as long as the resources which comprise the MBMS bearer are available, higher bit-rate codecs can be used. However, when capacity is limited, and a request to transmit a new media stream is received, the sources of the active media stream can be instructed by the PTT call controller to switch to a lower bit-rate (e.g., by including the lower bit rate in the floor Grant and floor Taken messages to the UE), or the PTT call controller can alternatively transcode the media streams to a lower bit rate to accommodate the additional call. This is show in shown in FIG. 6.

More particularly, FIG. 6 illustrates is a PTT call controller 602 managing a shared MBMS bearer in each MBMS service area A (604), B (606) through X (608). A large arrow 610 represents RF resources allocated to a single shared MBMS bearer identified by TMGI 10 for MBMS service area A. In this example, all the resources associated with the shared MBMS bearer 610 were allocated to support media streams 614, 618, 622, and 626 transmitted, respectively, for a talkgroup 612 (comprising recipient members UE R1 and UE R2), a talkgroup 616 (comprising recipient members UE G1, UE G2, and UE G3), a talkgroup 620 (comprising recipient member UE B1), and a talkgroup 624 (comprising recipient members UE P1 and UE P2). Then a request for transmission of a new media stream 630 for a talkgroup 628 (comprising recipient members UE Y1, UE Y2, and UE Y3) is received. Rather than queuing the request or preempting one of the active media streams, the bit rates for the active media streams are reduced to make space for the new group call. (Note that the height of each media packet is slightly shorter then shown in FIG. 4.

Figure 7:
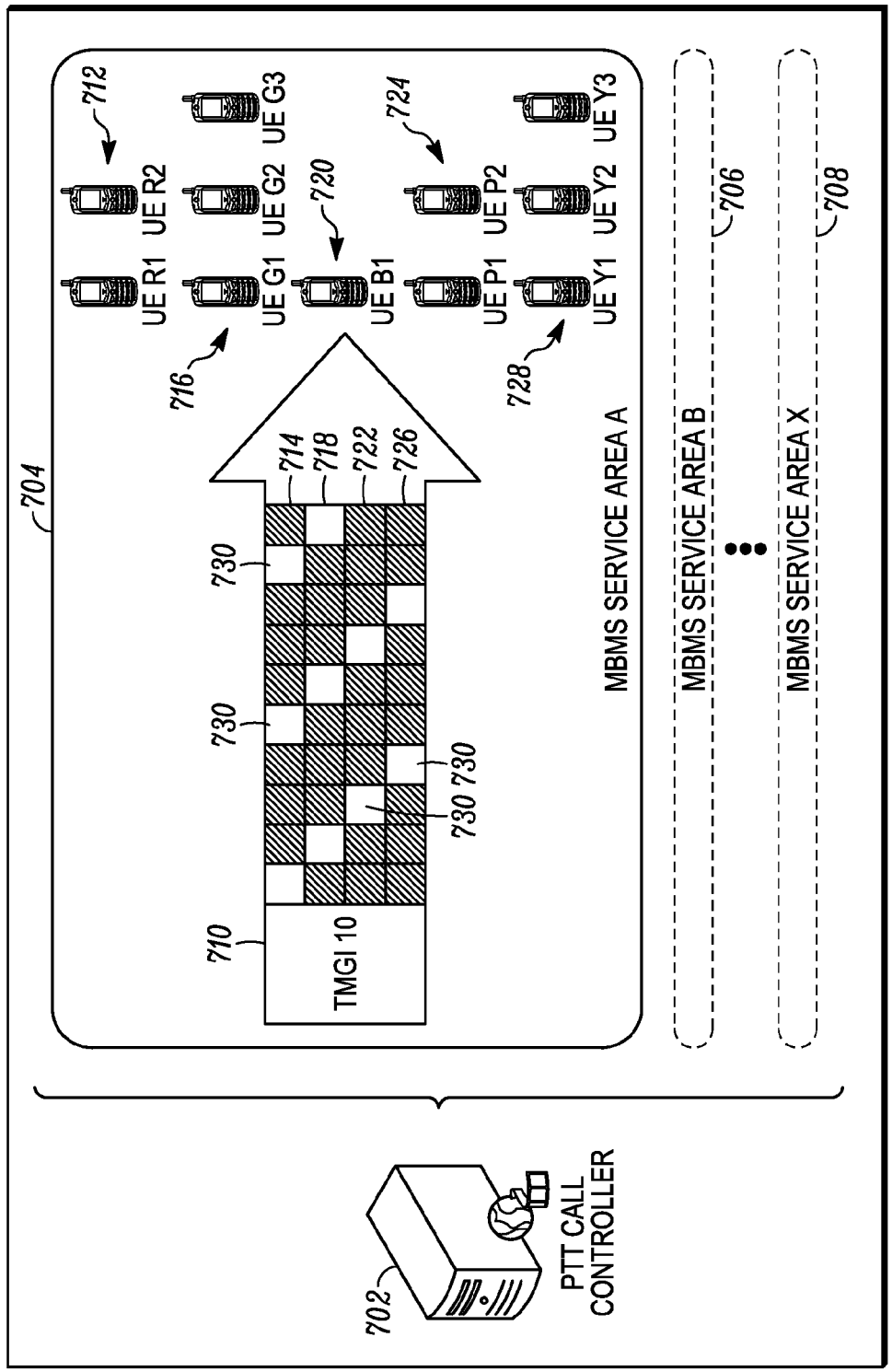
FIG. 7 is a pictorial diagram illustrating a plurality of media streams being transported over a shared MBMS bearer in accordance with some embodiments.

Alternatively, rather than adjusting the bit-rates of the media streams, another capability of this approach is the ability for the PTT call controller to "steal" resources or capacity that have been allocated to other active media streams to "make room" for a higher priority media stream, for instance, without having to preempt a media stream. This is shown in FIG. 7. More particularly, FIG. 7 illustrates is a PTT call controller 702 managing a shared MBMS bearer in each MBMS service area A (704), B (706) through X (708). A large arrow 710 represents RF resources allocated to a single shared MBMS bearer identified by TMGI 10 for MBMS service area A. In this example, all the resources associated with the shared MBMS bearer 710 were allocated to support media streams 714, 718, 722, and 726 transmitted, respectively, for a talkgroup 712 (comprising recipient members UE R1 and UE R2), a talkgroup 716 (comprising recipient members UE G1, UE G2, and UE G3), a talkgroup 720 (comprising recipient member UE B1), and a talkgroup 724 (comprising recipient members UE P1 and UE P2). Then a request for transmission of a new media stream that includes packets 730 for a talkgroup 728 (comprising recipient members UE Y1, UE Y2, and UE Y3) is received.

As with the previous example (shown in FIG. 6), four media streams are currently active, consuming all the resources allocated to the MBMS bearer when the request for a high priority media stream, for instance, comprising the packets 730 (e.g., an emergency call) for the talkgroup 728 is received. Rather than preempting one of the active media streams, an alternative approach is for the PTT call controller 702 to periodically drop media packets for the lower priority media streams 714, 718, 722, and 726 to make space for the higher priority media stream. Although this reduces the quality of the lower priority media stream and is likely not something that would be done all the time, there can be cases when such behavior is warranted (e.g., during a crisis or when all of the media stream are of equal (e.g., high priority). Also, when the shared MBMS Bearer is sized to support more simultaneous sessions than illustrated in this example, the number of packets which need to be dropped per media stream can decrease significantly.

Turning again to method 200 in FIG. 2, if (222) resources cannot be made available to support a request to transmit a new media stream, the PTT call controller continues with traditional processing (224) including the possibility of denying the request to source media, queuing the request until sufficient rescores become available, or preempting active media streams to make bandwidth available.

At some subsequent time, the PTT call controller 102 receives a request to end the transport of one or more of the media streams being transported on the shared MBMS bearer.

For example, the request comprises a TBCP Release message as defined in the OMA PoC TS, or the request to end the transport of the media stream may be implied by the expiration of a hang timer. In response thereto, the PTT call controller 102 de-assigns the capacity that the media stream was utilizing and updates the resource management database. Optionally, the PTT call controller communicates to the group members that the MBMS bearer is no longer supporting their communication group.

Looking at the present teachings from another perspective, in an embodiment, the shared MBMS bearer is established with a guaranteed bit rate, as required by the 3GPP TS. However, the PTT call controller 102 can dynamically adjust the various media streams simultaneously assigned to the same shared MBMS bearer so that the bearer appears as a variable bit-rate bearer service with an upper bound on capacity. For example, the shared MBMS bearer may initially be carrying the media streams for multiple talkgroups using a high bit-rate codec. Later, the PTT call controller reduces the bit-rate for these talkgroup to allow media streams from additional talkgroups to be added. Even later, the PTT call controller can selectively drop media packets to allow a high priority media stream to be added. However, the whole time the shared MBMS bearer actually provides a constant guaranteed bit rate service.

Figure 8:
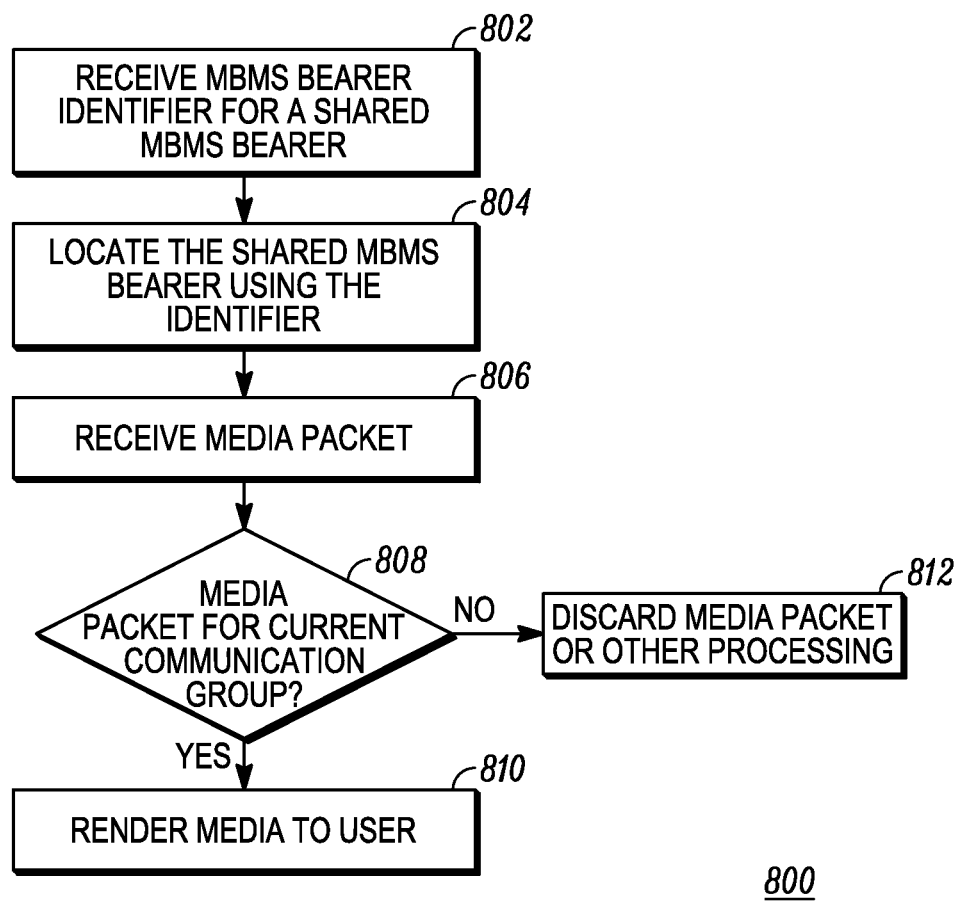
FIG. 8 is a flow diagram illustrating a method performed by a UE for receiving a media stream that is being simultaneously transported with at least one other media stream over a shared MBMS bearer in accordance with some embodiments.

In order to use a shared MBMS bearer, FIG. 8 illustrates the corresponding behavior (a method 800) performed in the UE in a first communication group. The UE receives (802) a MBMS bearer identifier (e.g., TMGI/IP multicast address) that identifies a shared 3GPP MBMS bearer that is used to transport a combined media stream comprising a first media stream of the first communication group and a second media stream of a second communication group, wherein the first media stream is identified by a first communication group identifier (e.g., a talkgroup identifier) and the second media stream is identified by a second communication group identifier. The UE can receive the MBMS bearer identifier using any of the means described above. The UE locates (804) the shared 3GPP MBMS bearer using the MBMS bearer identifier, and starts receiving (806) the media packets transmitted on the bearer.

After receiving a media packet, the UE needs to filter out (808) the "wanted" media packets from the "unwanted" media packets. This can be done using the communication group identifiers embedded in the packets to differentiate between the multiple media streams so that the UE can properly process the one or more media stream for its communication group. As described above, the communication group identifiers can be included in the SDP header or can be included in an application content fields. If, at 808, a particular packet is for the UE's current communication group, the UE renders (810) the media to a user and obtains the next media packet. If the media packet received is not for the UE's current communication group, the UE can take any number of actions (812) including simply discarding the media packet or storing it for playback later, before receiving the next media packet.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for allocating Multimedia MBMS bearers in a 3GPP compliant system as described herein. The non-processor circuits may include, but are not limited to, a radio receiver, a radio transmitter, signal drivers, clock circuits, power source circuits, and user input devices. As such, these functions may be interpreted as steps of a method to perform the allocating of Multimedia MBMS bearers in a 3GPP compliant system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transporting a plurality of media streams over a shared Multimedia Broadcast/Multicast Service (MBMS) bearer in a 3rd Generation Partnership Project (3GPP) compliant system, the method comprising:
   an infrastructure device coupled to the 3GPP compliant system and using application layer processing to perform:
   receiving a first request to transmit a first media stream to a first communication group;
   identifying a shared MBMS bearer in a first 3GPP MBMS service area that is already transporting a second media stream to a second communication group;
   determining whether the shared MBMS bearer has sufficient capacity to transport both the first media stream and the second media stream simultaneously;
   when the shared MBMS bearer has sufficient capacity, simultaneously sending both the first media stream and the second media stream on the shared MBMS bearer.

2. The method of claim 1, wherein simultaneously sending both the first media stream and the second media stream on the shared MBMS bearer comprises, at the application layer, multiplexing packets of the first and second media streams on the shared MBMS bearer.

3. The method of claim 1, wherein the shared MBMS bearer is identified by a Temporary Mobile Group Identity.

4. The method of claim 1 further comprising the infrastructure device including a first identifier that identifies the first media stream in media packets of the first media stream and including a second identifier that identifies the second media stream in media packets of the second media stream to differentiate the first media stream in media packet of the second media steam from the second media stream on the shared MBMS bearer.

5. The method of claim 4, wherein the first identifier comprises a first communication group identifier for the first communication group, and the second identifier comprises a second communication group identifier for the second communication group.

6. The method of claim 5, wherein the first and second communication group identifiers are talkgroup identifiers.

7. The method of claim 1, wherein the first request to send a media stream comprises a Push-to-Talk request.

8. The method of claim 1 further comprising the infrastructure device using application layer processing to perform:
   when the shared MBMS bearer has insufficient capacity, modifying one or both of the first and second media streams in order to multiplex, at the application layer, packets of the first and second media streams onto the shared MBMS bearer.

9. The method of claim 8, wherein modifying one or both of the first and second media streams comprises dropping some of the packets of one or both of the first and second media streams, at the application layer.

10. The method of claim 8, wherein modifying one or both of the first and second media streams comprises causing a bit rate of one or both of the first and second media streams to be lowered.

11. The method of claim 1, wherein identifying the shared MBMS bearer in the first 3GPP MBMS service area comprises the infrastructure device determining that a member of the first communication group is located in the first 3GPP MBMS service area.

12. The method of claim 11 further comprising the infrastructure device receiving a location update message from the member of the first communication group, wherein the location update message includes an identifier that identifies the first 3GPP MBMS service area.

13. The method of claim 12, wherein the identifier that identifies the first 3GPP MBMS service area comprises a Multicast Broadcast Single Frequency Network Area Identifier (MBSFN-Area ID).

14. The method of claim 1, wherein the first and second media streams have the same bit rate.

15. The method of claim 1, wherein the first and second media streams have a different bit rate.

16. The method of claim 1, wherein the capacity of the MBMS bearer is sized to transport a first plurality of media streams having the same minimum bit rate and a second smaller plurality of media streams having the same maximum bit rate, wherein the maximum bit rate is larger than the minimum bit rate.

17. The method of claim 1, wherein the MBMS bearer is the sole MBMS bearer for transporting media in the first 3GPP MBMS service area.

18. An infrastructure device capable of transporting a plurality of media streams over a shared Multimedia Broadcast/Multicast Service (MBMS) bearer in a 3rd Generation Partnership Project (3GPP) compliant system, the infrastructure device comprising:
   a processing device that is configured to, using application layer processing:
   receive a first request to transmit a first media stream to a first communication group;
   identify a shared MBMS bearer in a first 3GPP MBMS service area that is already transporting a second media stream to a second communication group, wherein the second communication group is different from the first communication group;
   determine whether the shared MBMS bearer has sufficient capacity to transport both the first media stream and the second media stream simultaneously;
   when the shared MBMS bearer has sufficient capacity, simultaneously send both the first media stream and the second media stream on the shared MBMS bearer.

* * * * *